United States Patent [19]
Brooks

[11] 3,887,865
[45] June 3, 1975

[54] EDDY CURRENT TESTING APPARATUS USING SEGMENTED MONOTURN CONDUCTIVE MEMBERS

[75] Inventor: Robert A. Brooks, Rye, N.Y.

[73] Assignee: Magnetic Analysis Corporation, Mount Vernon, N.Y.

[22] Filed: Feb. 15, 1974

[21] Appl. No.: 442,847

[52] U.S. Cl. .............................................. 324/40
[51] Int. Cl. ........................................... G01r 33/12
[58] Field of Search ................................ 324/37, 40

[56] References Cited
UNITED STATES PATENTS

| | | | |
|---|---|---|---|
| 2,315,943 | 4/1943 | De Lanty | 324/40 |
| 3,361,960 | 1/1968 | Renken, Jr. et al. | 324/40 |

FOREIGN PATENTS OR APPLICATIONS

| | | | |
|---|---|---|---|
| 520,871 | 5/1940 | United Kingdom | 324/37 |
| 994,171 | 6/1965 | United Kingdom | 324/37 |

OTHER PUBLICATIONS

Kim et al., Flux Concentrator for High-Intensity Pulsed Mag. Fields, Rev. of Scien. Ins., Vol. 30, No. 7, July 1959, pp. 524-533.

*Primary Examiner*—Robert J. Corcoran
*Attorney, Agent, or Firm*—Pennie & Edmonds

[57] ABSTRACT

One or more monoturn conductive members are formed of a plurality of separate segments which are assembled in insulated relationship in an opening of a body section which supports one or more coils encircling the opening. The assembled segments are secured in the body section in cooperative relationship with the coil(s) and provide an inner aperture for receiving an object to be tested. Enlarged ends or intermediate portions of objects may be passed through the opening in the body section and the segments then inserted and secured in place. A coil energized with alternating or pulsed current produces current flow in like directions around the surface segments of the aperture and thereby produces a magnetic field which induces eddy currents in the object. Variations in the eddy currents are detected and indicated. A pair of segmented monoturn members with respective detector coils supported by the body section may be employed.

7 Claims, 9 Drawing Figures 3,887,865

SHEET 1

EDDY CURRENT TESTING APPARATUS USING SEGMENTED MONOTURN CONDUCTIVE MEMBERS

BACKGROUND OF THE INVENTION

Eddy current testing apparatus is well-known, and is useful for the non-destructive testing of conductive objects to determine variations therein, particularly defects or flaws. In many cases a coil assembly is employed which encircles the object under test, and is energized to induce eddy currents in the object which vary in amplitude and/or phase with defects or flaws in the object. Means responsive to such variations are then used to indicate the defects or flaws. Energizing AC voltages in the form of sine or square waves have been employed to produce a flow of alternating current in the coil assembly, and DC pulses have also been employed.

Various types of coil assemblies have been used, depending on the particular application. Frequently a primary coil and a pair of spaced detector coils connected in null configuration are employed in flaw detectors, with the detector coils encircled by or closely adjacent the primary coil. In comparator instruments separate pairs of primary and detector coils may be employed, with the object under test placed in one pair and a reference object placed in another pair, and the detector coils connected in null configuration. Instead of separate primary and detector coils, a pair of coils driven in a bridge configuration may be employed.

It is also possible to employ a single encircling coil and utilize changes in the coil impedance due to the eddy current variations to indicate defects or flaws.

Usually such coil assemblies are designed to closely encircle the object under test so as to promote sensitivity.

Upon occasion it is desired to test objects such as wire rope, rods, tubes, etc. where each end, or the only end conveniently available, is considerably larger in diameter or cross-sectional dimensions than the major portion to be tested. In such case it has commonly been necessary to use a coil assembly having an inside diameter (I.D.) sufficient to allow the large end to pass therethrough. The resultant air gap between the coil assembly and the smaller diameter portion of the object to be tested may markedly reduce the sensitivity to flaws and other defects. A similar problem arises in testing long lengths of wire or tubing where sections are joined together by butt welds.

In application Ser. No. 392,509 filed Aug. 29, 1973 by Brooks and Wallace, eddy current testing apparatus is disclosed using one or more monoturn conductive members having an inner aperture and an encircling surface with a slot extending from the aperture to the encircling surface. An encircling coil supplied with alternating or pulsed current produces current flow around the inner surface of the aperture and induces eddy currents in an object located in the aperture. Depending on the particular type of apparatus, a detector coil may encircle a monoturn member, or two or more monoturn members with encircling detector coils may be employed. Each monoturn member is usually an integral piece of conductive material with a slot therein, although it would be possible to join two sections together in conductive relationship at a pair of adjacent ends, with a non-conductive separation of the other ends to form the slot.

It has now been found possible to form a monoturn conductive member by assembling two or more separate segments insulated from each other, so that there are a plurality of non-conductive separations extending from the segmented inner aperture to the segmented encircling surface. In such a member it has been found that current flow in the individual segments produces currents in the surface of the aperture segments which are in like directions around the aperture and produce a magnetic field similar to that of a unitary monoturn.

In application Ser. No. 392,509 the term "monoturn conductive member" is employed since, when energized by an encircling coil, the current flow around the surface of the aperture produces a magnetic field in and adjacent the aperture as though it were a directly energized single turn coil. In the present application the term "segmented monoturn conductive member" is employed since the individual segments, when assembled, form a composite member in which current flow around the aperture produces a magnetic field similar to that of a unitary monoturn conductive member upon energization by an encircling coil. Segmented monoturn members may also be used for detection purposes.

The present invention utilizes such a segmented monoturn structure to produce a test assembly which allows the testing of objects having enlarged ends or enlarged intermediate sections without seriously reducing the sensitivity to flaws or defects in the smaller portion of the object.

SUMMARY OF THE INVENTION

In accordance with the present invention, a coil assembly is supported by a body structure having an opening therethrough, and a monoturn structure is formed of a plurality of separate segments which when assembled in the opening in insulated relationship form one or more monoturn members cooperating with the coil assembly. Mounting means are provided for securing the assembled segments in place.

With this construction, the opening in the body structure can be large enough to allow the passage of an enlarged end of an object to be tested, and the monoturn segments then inserted and secured in place. In the case of an enlarged intermediate section, the segments can be removed to pass the section and then reinserted. The aperture in the assembled monoturn structure can be selected to closely encircle the smaller portion of the object, thereby improving the sensitivity to defects or flaws therein.

One or more segmented monoturn members may be employed, together with one or more coils, to suit the requirements of the particular testing apparatus employed. It is particularly contemplated to employ a pair of segmented members positioned in side-by-side relationship with an energizing coil encircling both members and a pair of detector coils encircling respective members. In such case respective segments of the two monoturn members are advantageously secured together in insulated relationship.

DESCRIPTION OF THE SPECIFIC EMBODIMENTS

Figure 1:
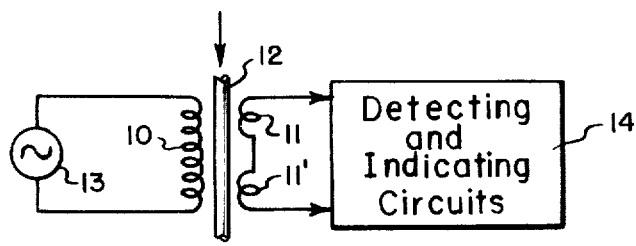
FIGS. 1, 2 and 3 illustrate different types of eddy current testing apparatus in which the invention may be used.

FIG. 1 illustrates an example of a known type of eddy current flaw detector. A test coil assembly comprises a primary coil 10 and a pair of detector coils 11, 11' connected in opposition to form a null arrangement. The coils normally are coaxial and an object 12 to be tested is fed coaxially through the coils. The primary coil 10 is supplied with energizing current from source 13 which may be a source of sine or square waves or a source of pulses, as desired. Usually different sine or square wave frequencies or different PRF's (pulse recurrence frequencies) are provided to facilitate detection of flaws or defects at different depths in the object 12, and O.D. and I.D. flaws in a tube.

Current in the primary coil 10 induces eddy currents in object 12 which vary with defects or flaws in the object. In the absence of defects or flaws, the signal output of the null detector coils 11, 11' will be approximately zero. When a defect or flaw appears, the signals in coils 11, 11' become unbalanced, yielding signal outputs which vary in phase and/or amplitude. Detecting and indicating circuits 14 process the signal outputs to yield suitable indications, and are described in more detail in the above-identified application.

Figure 2:
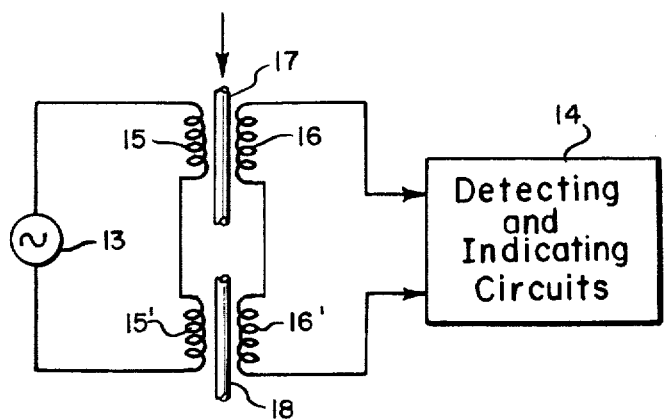

FIG. 2 shows a coil arrangement suitable for a comparator. Here a pair of primary coils 15, 15' with associated detector coils 16, 16' are provided for comparing an object 17 under test with a known object 18 and indicating variations therebetween. The primary coils may be connected in series or parallel, and supplied with energizing alternating or pulsed current from a suitable source such as 13 in FIG. 1. The detector coils 16, 16' may be connected in a null configuration and the output supplied to suitable detecting and indicating circuits 14. These circuits may be similar to those of FIG. 1, and simpler processing circuits may be used if desired. Objects of different size, but otherwise free of defects or flaws, may be separated, and it will be understood that the term "variations" includes such an operation.

Figure 3:
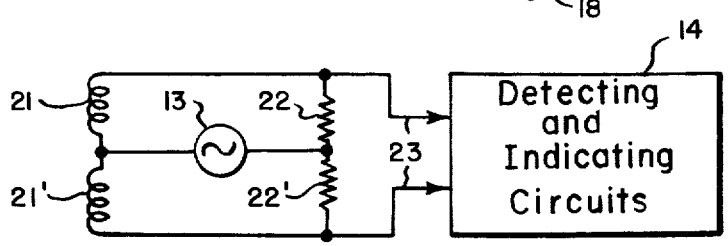

Instead of using separate primary and detector coils, single coils in a bridge arrangement may be used in either of the above-described apparatus. FIG. 3 shows two coils 21, 21' and two resistors 22, 22' in a bridge configuration. Energizing source 13 is connected across one diagonal of the bridge, and signal output leads 23 are connected across the other diagonal. In the presence of defects or flaws, or other variations in an object or objects within coils 21, 21' (not shown), the resulting change in impedance of the coils will unbalance the bridge and produce output signals in lines 23. These may be processed as above described. Instead of resistors 22, 22' a balanced transformer could be employed, as is known in the art.

Other forms of eddy current testing apparatus are known but not specifically illustrated. Thus a single coil may be employed in a multi-frequency testing apparatus as disclosed in U.S. Pat. No. 3,135,914 to Callan et al. Also, instead of using pairs of coils to generate separate signals for comparison as in FIGS. 1-3, the output of a single coil could be compared with a separately generated reference signal.

Figure 4A:
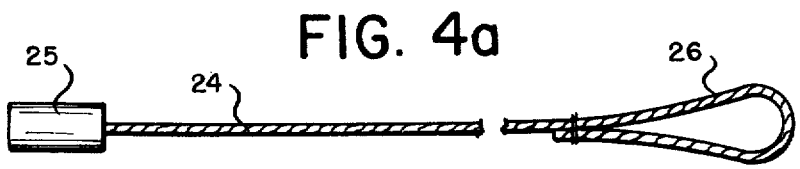
FIGS. 4a and 4b illustrate objects with enlarged ends which apparatus of the invention can test.

FIG. 4a illustrates a wire rope 24 having an enlarged member 25 such as a thimble attached to one end and a loop 26 formed at the other end. After a period of use it may be desired to test the wire rope to insure that it is still in satisfactory condition, free from broken strands and the like.

Figure 4B:
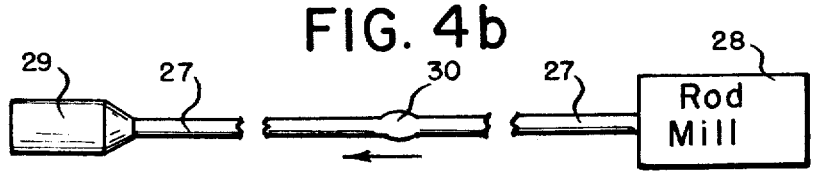

FIG. 4b illustrates a rod or tube 27 issuing from a mill 28 and having an enlarged end 29 formed thereon. Or, end 29 may be an irregular or deformed end due to severing a previous section. A butt weld is also shown at 30.

In order to test wire rope section 24, or rod or tube sections 27, it is desirable to have a test structure closely encircling the rope, rod or tube to promote sensitivity. Yet it is necessary for the test structure to pass an enlarged end, or intermediate enlargement.

Figure 5:
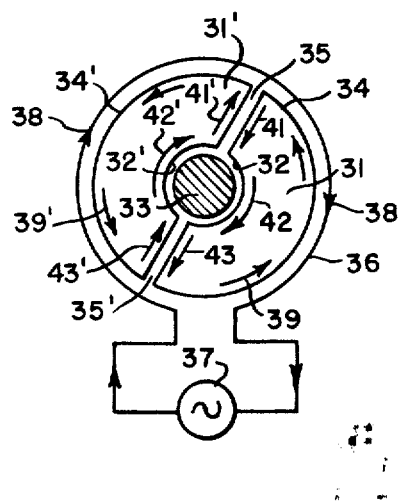
FIG. 5 illustrates current flow in a segmented monoturn member.

FIG. 5 illustrates diagrammatically a segmented monoturn conductive member formed of two separate insulated segments 31, 31'. In the assembled relationship shown, the inner surfaces 32, 32' form a segmented inner aperture for receiving an object 33 to be tested. A segmented surface 34, 34' encircles the aperture and is spaced therefrom. Separations 35, 35' extend from the aperture to the segmented surface. A coil 36 of the desired number of turns encircles the segmented surface, and is here shown as a single turn for convenience of explanation.

When an alternating or pulsed current is supplied to coil 36, as by generator 37, at a given instant the current will flow clockwise as shown by arrows 38. This will induce corresponding eddy currents in and near the surfaces 34, 34' of the conductive segments, but in the opposite direction, as indicated by arrows 39, 39'. In segment 31 the current 39 flows down one side of separation 35 (arrow 41), clockwise around the segmental surface 32 of the aperture (arrow 42), and outward at separation 35'(arrow 43). In segment 31', current 39' flows in the opposite directions in the sides of the separations (arrows 41', 43') but in the same clockwise direction around the aperture segmental surface 32' (arrow 42'). With alternating current excitation, when the current in coil 36 reverses, the directions of the currents in the segments reverse from those shown.

Inasmuch as the currents around the segmental surfaces 32, 32' of the aperture are in like directions at any given instant, the magnetic field produced thereby is much the same as would be produced by a flow of current around a continuous surface. Hence the overall effect of the segmented monoturn of FIG. 5 is similar to the unitary monoturns of the aforesaid application. Although the added separation may somewhat increase the loss in the monoturn member, it has been found that satisfactory testing sensitivity can still be obtained. More than two segments can be employed if desired.

Figure 6:
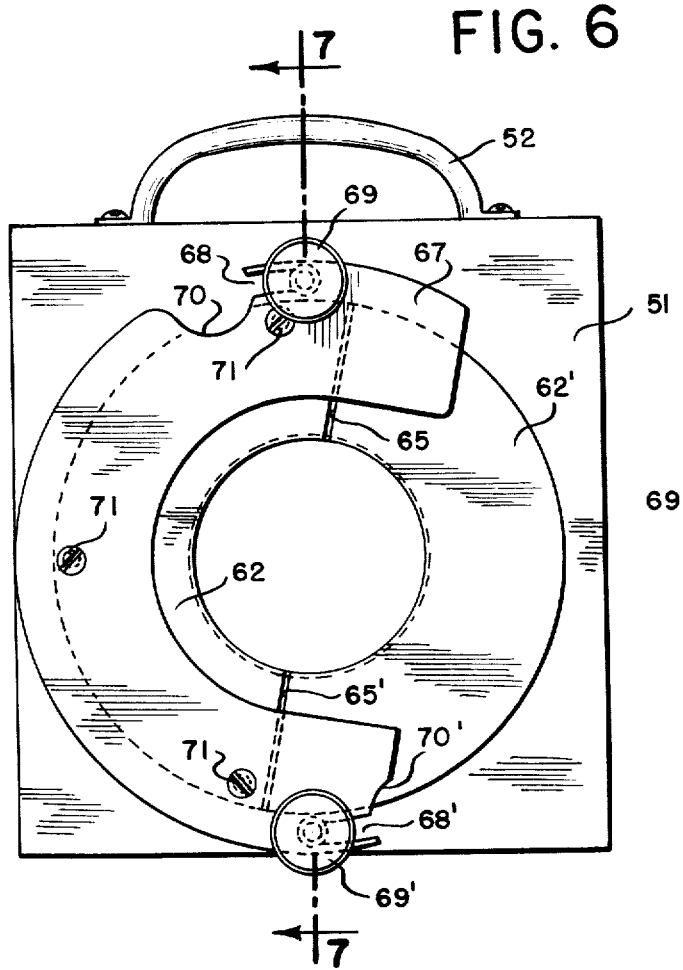
FIG. 6 is a face view of one embodiment of a test assembly in accordance with the invention.
Figure 7:
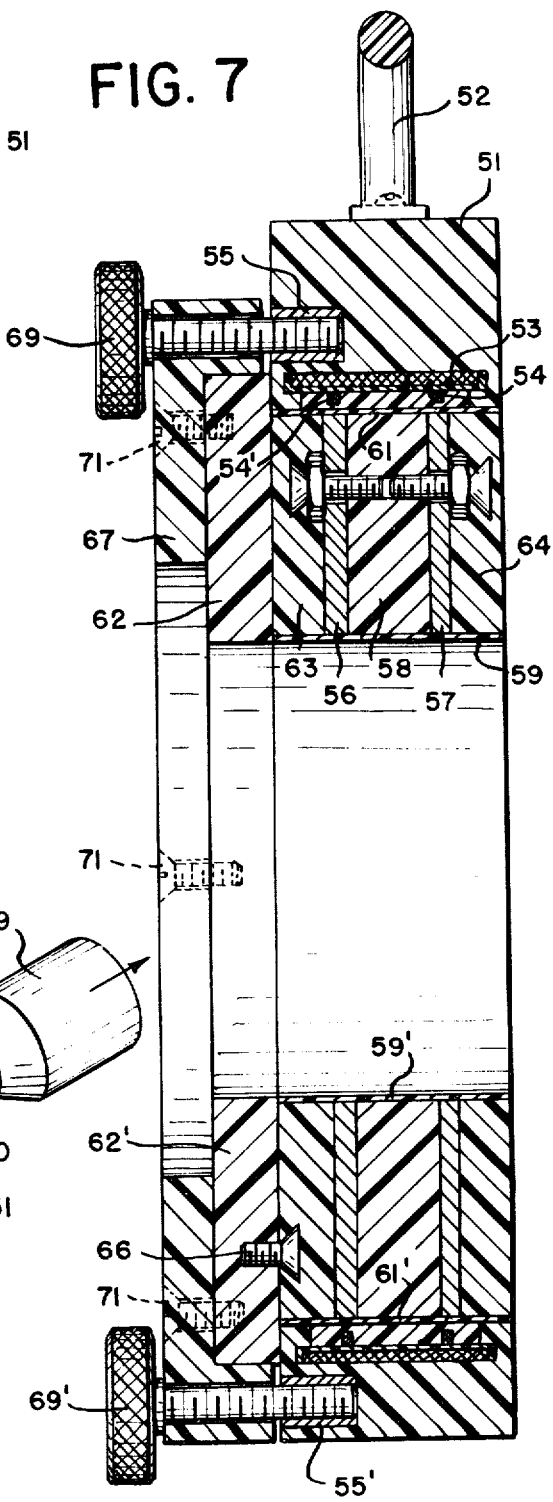
FIG. 7 is a cross-section along the line 7—7 of FIG. 6.

Referring to FIGS. 6 and 7, a body section 51 has a handle 52 attached thereto. Aa primary coil 53 and a pair of detector coils 54, 54' are wound on suitable coil forms and supported by the body section. Screw inserts 55, 55 are also provided. Conveniently the coils and screw inserts are held in a fixture and an insulating plastic cast therearound to form the body section.

A removable segmented structure includes a pair of monoturn conductive members 56, 57 bolted together with an insulating spacer 58 therebetween, thin-walled inside and outside liners 59 and 61 of durable insulating material such as fiberglass, and a mounting member 62 of insulating material. These may initially be unitary members suitably held together as by an insulating bonding material 63 such as an epoxy material, and an outer protective layer 64. Then they may be sawed in half as indicated at 65, 65' to form two half-circle segments. Dummy screws 66 may be used to insure firm attachment. Desirably the bolts, screws and nuts are of non-magnetic material, such as nylon screws and brass nuts.

In FIG. 7 it will be noted that mounting member 62 overlaps body section 51 so as to establish correct axial positioning of monoturn members 56 and 57 in alignment with detector coils 54, 54'. Desirably the adjacent faces of the segments at 65, 65' are coated with an insulating material such as epoxy to assure that no electrical contact will occur and also to provide a close fit of the segments in the opening in body section 51.

A retaining member 67 is recessed to fit over the segments of mounting member 62 when in assembled relationship, and is provided with slots 68, 68' for receiving the shanks of knurled screws 69, 69'. Cutouts 70, 70' allow the retaining member to clear the heads of screws 69, 69' and then be rotated into the position shown. When the assembly is in place, the screws are tightened so as to prevent any movement or vibration of the segmented members. Retaining member 67 may be fastened to one of the segments, as by screws 71, or left separate.

Figure 8:
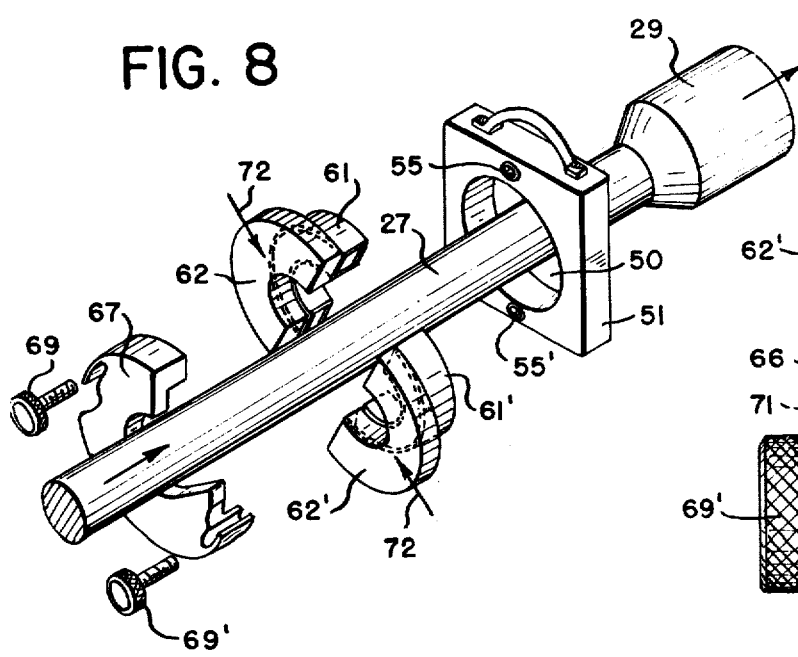
FIG. 8 is an exploded view of components of FIGS. 6 and 7.

FIG. 8 illustrates the assembly operation. With the segmented members removed, the enlarged end 29 is passed through the opening 50 in body section 51. The segments 61, 62 and 61', 62' are then placed around rod 27, moved together as indicated by arrows 72, and inserted into the opening 50. Retaining member 67 is then screwed in place. Member 67 is shown separate from segment 62, and somewhat rotated from its correct position, for ease of illustration. Also screws 69, 69' are shown separate, although they may be retained in inserts 55, 55'.

With a retaining member 67 of the form and orientation shown in FIG. 6, it may be desirable to orient segments 62, 62' about 90° from the position shown, to secure satisfactory clamping. The overall mounting means for securing the monoturn segments in their proper position with respect to the encircling coils may of course be changed if desired.

In practice, the opening 50 in body section 51 may be selected to accommodate the largest ends or intermediate sections expected to be encountered. Then a range of segmented structures may be made having an outside diameter to fit opening 50 but different inside diameters to fit the desired range of rods, etc. to be tested. For objects other than circular in cross-section, the shape of the aperture may be changed accordingly, as described in the above-identified application. For circular or non-circular apertures, the number of segments and the peripheral lengths of the inner surfaces thereof are selected to allow each segment to be fitted into place around the object to be tested, and then inserted in the body section.

While the invention is particularly directed to enable the testing of objects having enlargements therein, if desired the structure could also be used for the normal testing of objects of approximately uniform cross-section.

The arrangement of FIGS. 6 and 7 is particularly suitable for the flaw detector of FIG. 1. For the comparator of FIG. 2 two assemblies may be provided, each with a single monoturn and a pair of encircling coils, or only one assembly with a segmented monoturn provided for the object 17 to be tested and with a different arrangement used for reference object 18. For the bridge configuration of FIG. 3, a structure similar to FIGS. 6, 7 but without coil 53 may be employed. Or, a single monoturn with one encircling coil may suffice in some types of equipment. Other arrangements are possible as meets the requirements of a particular application. It will be understood that coil means as used in the claims may include one or more coils and that a segmented monoturn conductive structure may include one or more monoturns, with appropriate cooperation between the coils and monoturns for the particular application.

I claim:

1. Eddy current testing apparatus for the nondestructive testing of objects which comprises
   a. a body section having an opening therethrough,
   b. a coil supported by said body section and encircling said opening,
   c. a segmented monoturn conductive member for said opening formed of a plurality of separate segments which when assembled in the opening provide a segmented inner aperture for an object to be tested and a segmented surface encircling the aperture and spaced therefrom,
   d. said segments when in assembled relationship being insulated from each other,
   e. mounting means for securing said segments in said opening with said coil encircling said segmented encircling surface of the assembled monoturn member,
   f. means for supplying alternating or pulsed current to said coil for inducing current flow in said segmented encircling surface,
   g. said assembled monoturn conductive member being designed and adapted for producing current flow around the surface segments of said aperture in like direction opposite to the direction of current flow in said encircling surface in response to said current in said coil and thereby produce a magnetic field to induce eddy currents in an object located in the aperture,
   h. and detecting and indicating means responsive to variations in said eddy currents for indicating variations in said object.

2. Apparatus according to claim 1 in which said segments of the monoturn conductive member are constructed and adapted to be inserted in said opening of the body section after insertion in the opening of an object to be tested.

3. Apparatus according to claim 1 including a pair of segmented monoturn conductive members positioned in side-by-side relationship when assembled in said opening of the body section, respective segments being insulatedly secured together and said coil encircling both monoturn members when in assembled relationship, said detecting and indicating means including a pair of detector coils supported by said body section in position to encircle respective monoturn members when in assembled relationship.

4. In eddy current testing apparatus including means for inducing eddy currents in an object under test and detecting and indicating means responsive to variations in said eddy current for indicating variations in the object, the improvement which comprises
   a. a body section having an opening therethrough,
   b. a coil supported by said body section and encircling said opening,
   c. a segmented monoturn conductive member for said opening formed of a plurality of separate segments which when assembled in the opening provide a segmented inner aperture for an object to be tested and a segmented surface encircling the aperture and spaced therefrom,
   d. said segments when in assembled relationship being insulated from each other,
   e. mounting means for securing said segments in said opening with said coil encircling said segmented encircling surface of the assembled monoturn member,
   f. and means for supplying alternating or pulsed current to said coil for inducing current flow in said segmented encircling surface,
   g. said assembled monoturn conductive member being designed and adapted for producing current flow around the surface segments of said aperture in like direction opposite to the direction of current flow in said encircling surface in response to said current in said coil and thereby produce a magnetic field to induce eddy currents in an object located in the aperture.

5. Apparatus according to claim 4 in which said segments of the monoturn conductive member are constructed and adapted to be inserted in said opening of the body section after insertion in the opening of an object to be tested.

6. Apparatus according to claim 4 including a pair of segmented monoturn conductive members positioned in side-by-side relationship when assembled in said opening of the body section, respective segments being insulatedly secured together and said coil encircling body monoturn members when in assembled relationship, and including a pair of detector coils supported by said body section in position to encircle respective monoturn members when in assembled relationship.

7. A method of eddy current testing objects having enlargements therein which comprises
   a. feeding the enlarged portion of a said object through an opening in a test body section having coil means encircling said opening,
   b. thereafter inserting in said opening around the smaller portion of said object a plurality of separate insulated segments which in assembled relationship form a segmented monoturn conductive structure fitting in said opening and having an inner segmented aperture encircling said object and a segmented surface encircling the aperture and spaced therefrom,
   c. securing said segments in said opening in cooperative relationship with said coil means,
   d. energizing said coil means with alternating or pulsed current to induce current flow in said encircling segmented surface,
   e. said assembled monoturn conductive member being designed and adapted for producing current flow around the surface segments of said aperture in like direction opposite to the direction of current flow in said encircling surface in response to said current in said coil and thereby produce a magnetic field to induce eddy currents in an object located in the aperture,
   f. producing relative movement of said object through said aperture,
   g. and utilizing said coil means to indicate variations in said eddy currents and thereby variations in said object.

* * * * *